United States Patent [19]

Watkins

[11] Patent Number: 4,611,857

[45] Date of Patent: Sep. 16, 1986

[54] SOLAR POWERED FOCUSING AND DIRECTING APPARATUS FOR CUTTING, SHAPING, AND POLISHING

[76] Inventor: Ivan W. Watkins, 1530 Kilian Blvd., St. Cloud, Minn. 56301

[21] Appl. No.: 635,445

[22] Filed: Jul. 30, 1984

[51] Int. Cl.⁴ .............................................. E21B 7/14
[52] U.S. Cl. ..................................... 299/14; 350/620; 299/10
[58] Field of Search ...................... 299/10, 14; 175/11, 175/12, 13, 14, 15, 16; 350/505, 567, 568, 620; 237/1 R

[56] References Cited

U.S. PATENT DOCUMENTS

| | | | |
|---|---|---|---|
| 3,532,410 | 2/1968 | La Roche | 350/505 X |
| 3,544,165 | 4/1967 | Snedden | 175/16 X |
| 4,066,138 | 1/1978 | Salisbury et al. | 299/14 X |
| 4,090,572 | 5/1978 | Welch | 299/14 X |
| 4,270,844 | 6/1981 | Cobble et al. | 350/620 |
| 4,395,095 | 7/1983 | Horton | 350/567 X |

OTHER PUBLICATIONS

Wyatt, Stanley P., *Principles of Astronomy*, Allyn and Bacon, Inc., Boston, 1964, pp. 103-104.

Primary Examiner—Stephen J. Novosad
Assistant Examiner—Thomas J. Odar
Attorney, Agent, or Firm—Albert Watkins

[57] ABSTRACT

A solar powered cutting, shaping, and polishing device is disclosed. In the preferred embodiment a large concave parabolic reflector is mounted on an X and Y axis rotatable (telescope type) mount and directed towards the sun. A smaller convex parabolic reflector is mounted on an adjustable support structure attached to the large concave reflector such that the two reflectors can be made to share, or nearly share, the same focal point. Mounted between the large and small parabolic reflectors on an additional rotatable mount is a flat reflector. The large and small parabolic reflectors are used to concentrate solar energy to a desired and adjustable focal point. The flat reflector can then be used to direct the concentrated energy across a material in an operator-determined pattern. Depending on certain factors associated with the material and the positioning of the focal point, the material can then be cut, shaped, or polished as the user desires. Also disclosed is the use of lenses to perform the concentrating function.

19 Claims, 4 Drawing Figures

SOLAR POWERED FOCUSING AND DIRECTING APPARATUS FOR CUTTING, SHAPING, AND POLISHING

BACKGROUND OF THE INVENTION

Prior art cutting, shaping, and polishing techniques generally fall into three broad categories including guided or unguided cracking, abrasive forming, and localized heating.

Cracking may be done without an external guide, for example by following internal faults or, depending on the material, by following a cleavage plane. Guided cracking may be done in the case of rock by predrilling to create weak spots and then cracking between the drilled holes another example of guided cracking is glass cutting, where a weak line is formed by a glass cutter.

Abrasive forming is perhaps the most commonly used cutting, shaping and polishing technique. Included in this category are sawing, drilling, sanding, grinding, buffing and other techniques which are too numerous to mention.

Localized heating is often used in cutting and shaping metals by melting such as with a torch. Cutting of rock such as granite is also often done this way, by using a flame such as a fuel oil flame to cause individual crystals of rock to thermally expand by amounts which differ from neighboring crystals. This uneven thermal eaxpansion causes small flakes of granite to crack away from the main rock into an airstream which removes the flakes.

Additionally, it is known in the prior art to use solar energy to act as a source of energy for localized heating. However, prior art systems have several drawbacks which have prevented their widespread use.

Small focusing lenses are known to be useful for cutting, melting, and welding jewelry and other articles. Such lenses are usually built into a small frame and are often made from plastic as in the case of small hand-held fresnel type lenses. However, these lenses do not permit an adjustable focal length (the significance of which will be discussed later), nor do they provide for redirecting the solar radiation along a line in the X, Y, and Z planes other than parallel to the incident beam radiation.

Small reflectors or large arrays of reflectors are also widely used to concentrate and redirect solar energy. However, in the known prior art systems, it is impossible for a single operator to both adjust focal length and redirect to varying angles the solar radiation while simultaneously either cutting, shaping, or polishing some material of interest.

SUMMARY OF THE INVENTION

An object of this invention is to allow cutting, shaping, and polishing of hard materials such as rock and metal without the usual associated high cost of drill bits, saw blades, abrasive grit, labor, etc. found with cracking or abrasive techniques, or the high cost of energy found with energy intensive localized heating.

Another object is to allow cutting, shaping, and polishing of materials without regard to the size of the material.

Another object is to allow a single operator to control focal length and direction of concentrated solar radiation while simultaneously cutting, shaping, or polishing materials.

These and other objects are achieved through the use of a focusing and directing apparatus which controllably concentrates and directs solar radiation to a material where, depending upon characteristics of the material and the degree of focus, cutting, shaping, or polishing may be performed. The applications of such an apparatus include metalwork, rock work, road and tunnel building, and mining to name only a few possibilities.

DETAILED DESCRIPTION OF THE INVENTION

Figure 1:
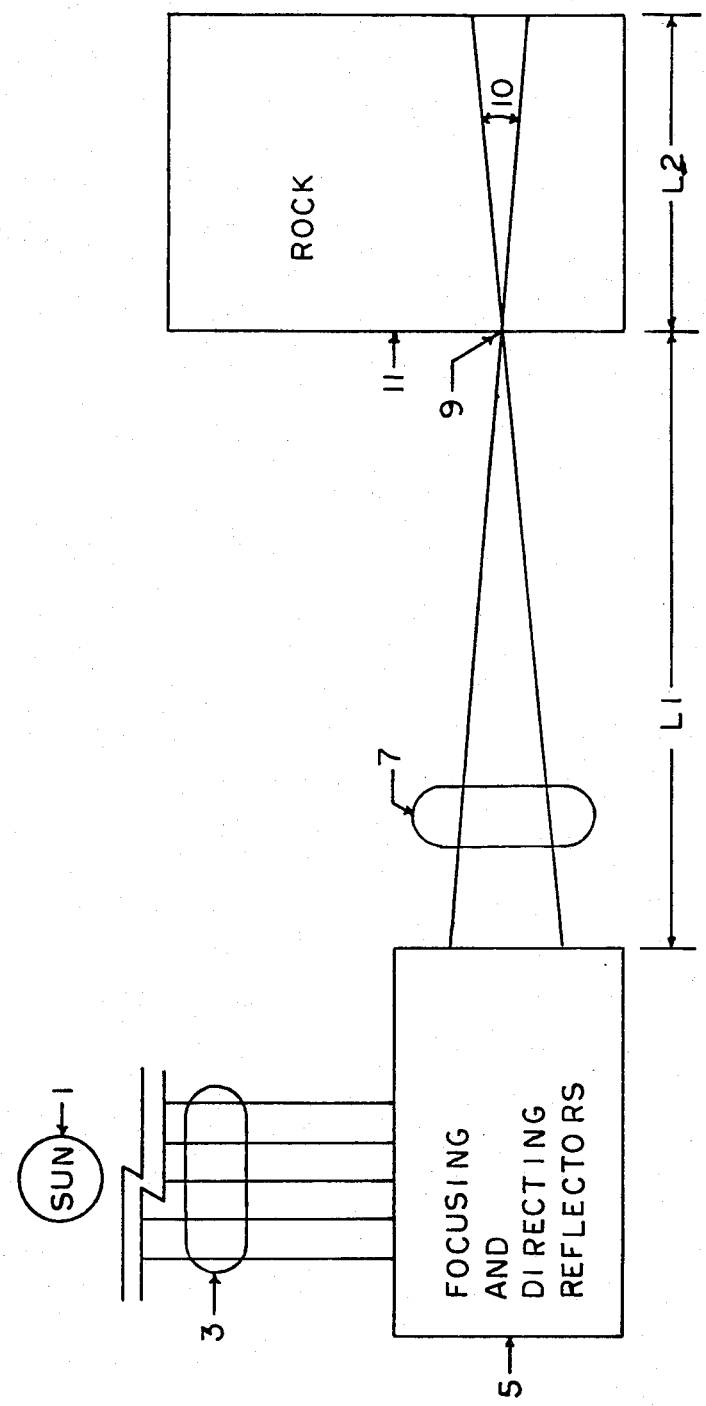
FIG. 1 shows the preferred embodiment of the present invention.

FIG. 1 discloses the preferred embodiment of the invention and its best mode of use. The sun 1 provides a source of energy for the invention in the form of essentially parallel beam radiation 3. The beam radiation 3 is focused and directed by focusing and directing reflectors 5, shown in more detail in FIG. 3. The focused radiation 7 is directed towards a material such as rock 11 shown. The material might also be steel or any of an almost unlimited variety of materials. The position where the focused radiation 7 shines along rock 11 is controllable by an operator, as is the distance to the real image point 9, approximated here by 11. Further, real image point 9 need not occur at the surface of the rock 11, but can be chosen to occur at any point after leaving focusing and directing reflectors 5. Provided image point 9 is chosen to be at the surface of rock 11, a certain divergence of focused radiation 7 will occur as focused radiation 7 penetrates rock 11. This is represented by angle 10, and can be considered the kerf produced by cutting rock 11.

Several features should be noted. As 11 is increased, angle 10 decreases, reducing the kerf. Therefore, a large 11 is used for a small kerf. For applications where the kerf is less significant, 11 can be small. Additionally, many cutting techniques are limited by the depth of cut 12. With focusing and directing reflectors 5, as long as sufficient focused radiation 7 is present per unit area, the depth of cut 12 can be nearly unbounded. This can be accomplished by making 11 very large, such that angle 10 remains small and the diameter of focused radiation 7 remains small for a large distance. Finally, due to the inherent smoothness of the focused radiation 7, any cuts made will also be very smooth with any irregularities being removed by the focused radiation 7.

To perform polishing in thermo-reversing (i.e. repeatably meltable and freezable) material, or even in several non-reversing materials, focal point adjustments are made in combination with sweep rates such that lower energies per unit area are applied than for cutting, resulting only in surface melting. It is also noted that for some materials such as granite, where uneven expansion may result in flaking, higher energy per unit area combined with a high sweep rate may be required to melt the surface before flaking can occur.

Figure 2:
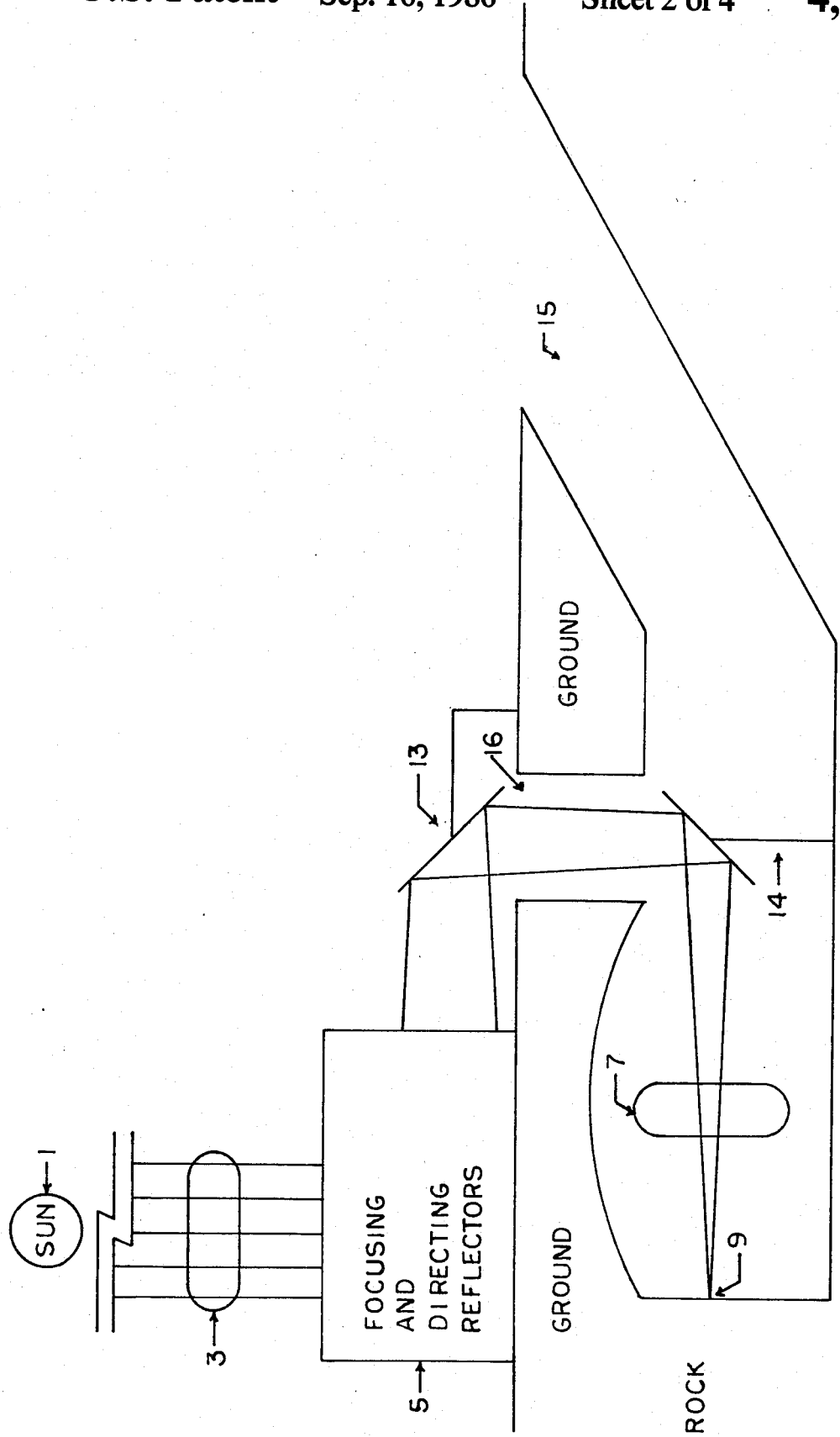
FIG. 2 shows the preferred embodiment of the present invention as applied to mine shaft operation or road tunnel.

FIG. 2 discloses typical application of the preferred embodiment to a mine shaft. It applies equally to the formation of a road tunnel. The sun 1 provides essentially parallel beam radiation 3 to the focusing and directing reflectors 5 which provide focused radiation 7 for use in cutting, shaping and polishing operations. Focused radiation 7 is directed to the large adjustable flat reflector 13. The reflectors 13 and 14 are rotatable through two axes on a mount such as the telescope mounting disclosed by Wyatt in *Principles of Astronomy*, 1964, P. 103. Once focused radiation 7 is directed to the first reflector 13, reflector 13 is then adjusted to direct focused radiation 7 into a mine shaft 15 towards a second reflector 14. Reflector 14 is then used to direct the focused radiation 7 as desired to perform cutting, shaping, and polishing. As shown, ventilation shaft 16 is used to conduct focused radiation 7 into mine shaft 15. This is thought to provide an extra safety factor since main entrance 15 is then left completely open to access. Focused radiation 7 could similarly be directed near the ceiling of mine shaft 15 through the main entrance. These safety precautions are similar to industrial laser safety practice. While additional reflectors 13 and 14 are required, it is noted that the focal length can be very large since the extra reflectors provide a long path for focused radiation 7. Reflectors 13 and 14 can additionally be used above ground, where insufficient space is available otherwise, to gain extra focal length.

Figure 3:
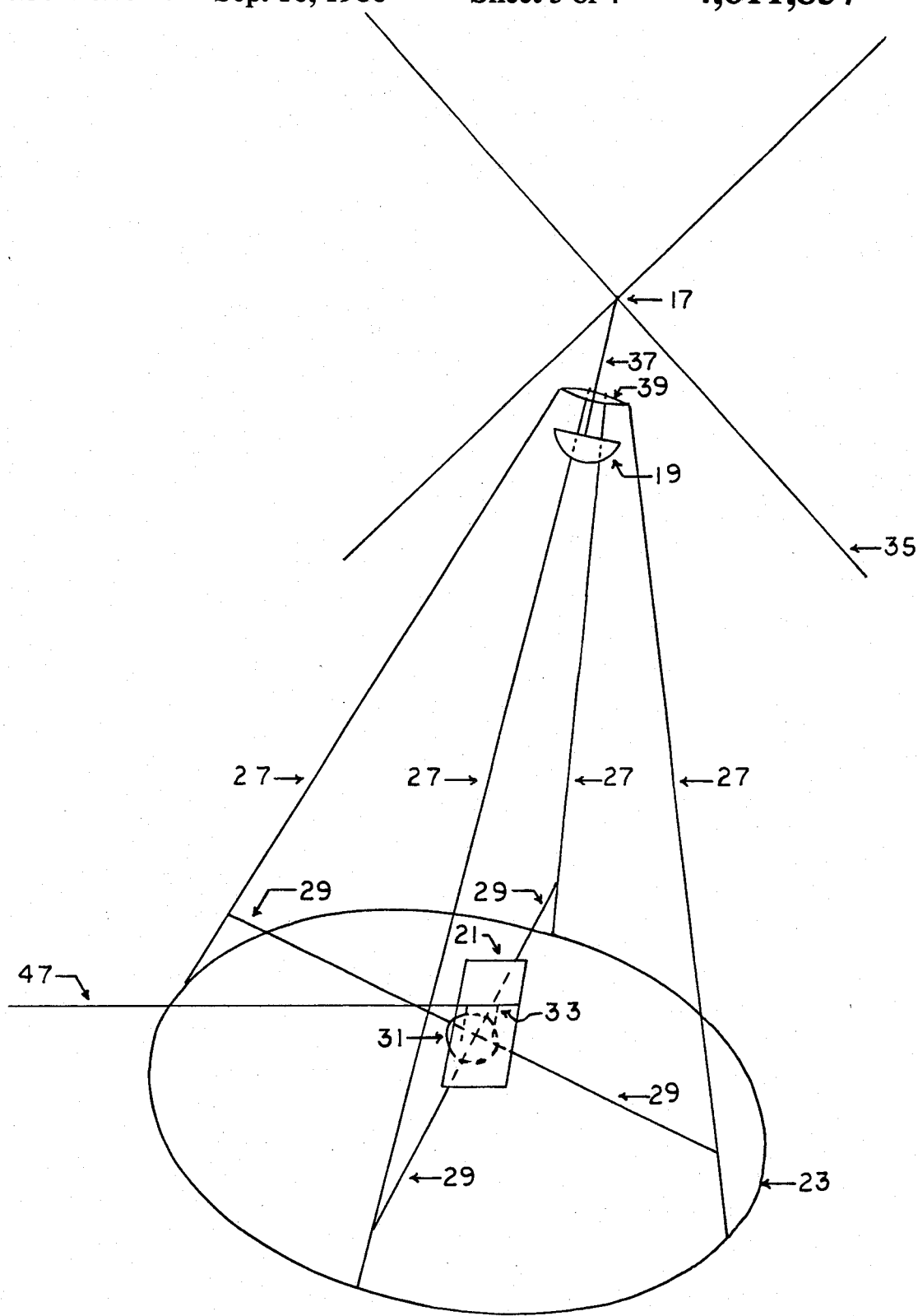
FIG. 3 shows the focusing and directing apparatus of the preferred embodiment.

FIG. 3 discloses the preferred embodiment of the focusing and directing reflectors 5. Large parabolic concave reflector 23 is attached to the four connecting rods 27. The proposed connection is to thread the ends of rods 27, drill four appropriate holes in reflector 23, and screw mount one nut on each side (inside and outside) of reflector 23. The use of such attachment allows preliminary alignment. However, any common method of attachment is sufficient provided reflectors 23 and 19 are in proper alignment to be discussed later. Connecting rods 27 are welded to a circular disk of approximately ½ inch plate metal 39. In the center of disk 39 is a threaded hole. Through the threaded hole is mounted threaded rod 37. Fixedly attached at one end of rod 37 is adjuster 35. Adjuster 35 is of sufficient length and shape to be reached by an operator standing next to reflector 23. Fixedly attached at the other end of rod 37 is small parabolic convex reflector 19. Additionally attached to connecting rods 27 are connecting rods 29. At the center of the "X" formed by rods 29 is a lazy susan 31. Lazy susan 31 is comprised of a bottom plate which is attached to rods 29, a top plate, and a circular bearing separating the two plates. Mounted to the top plate of lazy susan 31 are two vertical rods 33. The rods 33 have holes in the top which accomodate adjuster 47. Fixedly attached to adjuster 47 if flat reflector 21. The operation of the apparatus of FIG. 3 can be understood in conjunction with FIG. 4.

Figure 4:
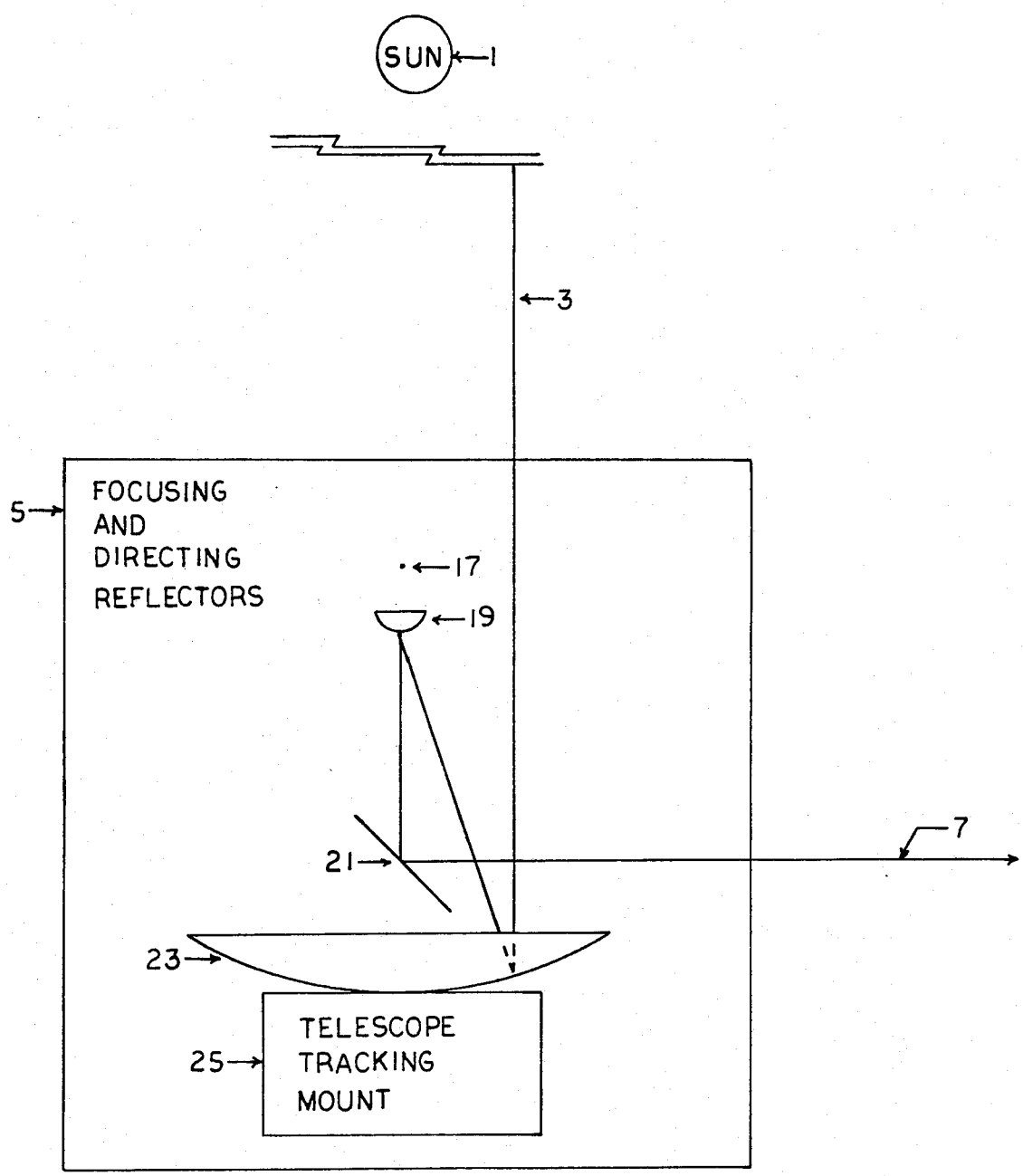
FIG. 4 shows the focusing and directing apparatus in operation, with all support structure removed for clarity.

FIG. 4 discloses the apparatus of FIG. 3 with all support structure removed for clarity. Additionally, FIG. 4 shows the telescope type tracking mount 25 to which reflector 23 is mounted. The operation of the system is as follows. The sun 1 provides essentially parallel beam radiation 3. Radiation 3 is reflected by reflector 23 towards focal point 17. When reflectors 19 and 23 are in proper alignment, they share (or nearly share) focal point 17. The net result is a focusing of beam radiation 3. The focused radiation 7 is then directed by reflector 21. Telescope tracking mount 25 is any one of a number of commercially available tracking mounts, also described by Wyatt, PP. 103-4. Mount 25 assures continuous focusing of beam radiation 3. After assembly of focusing and directing reflectors 5 reflectors 19 and 23 should share focal point 17 (properly aligned). This is equivalent to an image distance 11 of infinity. The operator then sets the image distance 11 to a desired distance by rotating adjuster 35. This results in rotation of threaded rod 37 through the threaded hole in plate 39. The net result is a raising or lowering of reflector 19 changing the image distance 11. It is advised that an additional stop be provided such that rod 37 can not be rotated beyond a point where the image distance 11 approaches zero. This can be done by stripping the threads on rod 37 at the appropriate point. This is to prevent focusing too much radiation onto too small a point of reflector 21, which could cause burned spots on reflector 21. As the operator selects image distance 11, The operator simultaneoulsy directs the radiation by either rotating adjuster 47 in the holes of vertical rods 33, which raises or lowers focused radiation 7, or by rotating the entire apparatus (47,33,21, and top plate of 31) on the lazy susan 31, which moves focused radiation 7 back and forth. Connecting rods 27 form natural stops for adjuster 47, preventing reflector 21 from being directed towards connecting rods 27. Additionally, lazy susan 31 forms a natural stop preventing reflector 21 from being directed towards reflector 23. Finally, an additional stop could be mounted on lazy susan 31 in the form of a vertical rod to prevent reflector 21 from being directed towards reflector 19.

The materials used for assembly are not critical so long as, where used for support, they are of sufficient strength to carry the load. Reflectors 19,21, and 23 are suggested to be made of some form of polished gold plate (electroplate, leaf, paint, . . . ), due to the excellent reflectivity of gold at the wavelengths of interest and to the excellent resistance to aging and weathering (oxidation, corrosion, ...) shown by gold. However, any suitable reflector can be used provided the individual reflectors are not overloaded.

The power available for cutting, shaping, and polishing is limited only by the size of the reflectors selected. For reflector 4 meters in diameter the available energy at sea level can be approximated as follows:

A = Area = $\pi r^2$ = 3.14(2 m)$^2$ = 12.6 m$^2$
S = Solar radiation at sea level $\approx$ 1 Kw/m$^2$
E = Efficiency $\approx$ 90% (5% reflective loss and 5% miscellaneous shading)
P = Power = A'S'E $\approx$ 11 Kw As noted, the entire energy content can be focused to a small real image 9.

The foregoing is not intended to be limiting in any way but rather is presented as the preferred embodiment of the invention to enable others. It is noted that lenses could be substituted for the reflectors shown, or a combination of lenses and reflectors. However, due to the possibly large size and correspondingly large power levels being controlled, the cost and limitations of lenses appear to be greater than those of reflectors. Additionally, where operations require a great distance between focusing and directing reflectors 5 and image point 9, or where access to reflectors 5 is difficult, as in FIG. 2, it is possible to set image distance 11 equal to infinity and use a second set of focusing and directing reflectors to refocus and redirect incoming radiation. In the case of FIG. 2 this would be accomplished by setting image distance 11 (from FIG. 1) to infinity (or just less than), and replace reflector 14 with a second set of focusing and directing reflectors. This would allow a single operator to control both focal length and direction of light from within a mine shaft or road tunnel. Additionally, while not discussed, it would be apparent to one of ordinary skill that, in the event that an excess of energy was available, such excess could be controlled either by shading or some form of misalignment of telescope tracking mount 25.

I claim:

1. An apparatus for focusing and directing solar energy comprising means for focusing and directing solar energy, said focusing and directing means having a real image distance, and adjusting means for enabling simultaneous adjustment of both said real image distance and said direction of focused and directed solar energy.

2. The apparatus of claim 1 wherein said adjusting means further provides control of said real image distance independent of said direction.

3. The apparatus of claim 2 wherein said adjusting means further provides control of said direction independent of said real image distance.

4. The apparatus of claim 3 wherein said adjusting means is fully adjustable by a single person.

5. The apparatus of claim 1 wherein said focusing and directing means comprises a first concave parabolic reflector, a second convex parabolic reflector, and a third plane reflector.

6. The apparatus of claim 5 wherein said second reflector is aligned so as to be, if so adjusted by an adjusting means, able to share the same focal point as said first reflector, said adjusting means enabling movement of said second reflector closer to, or further from said first reflector.

7. The apparatus of claim 6 wherein said focusing and directing means further comprises means for rotating said third plane reflector about two different axes, said rotation occurring without corresponding movement of said first reflector.

8. An apparatus for cutting, shaping, and polishing comprising means for focusing and directing a sufficient but not excessive quantity of solar energy to perform the processes of cutting, shaping, and polishing on a material, any of said processes being selectable by an operator at any given instant independent of any possible previous selection, said focusing and directing means having a real image distance, and adjusting means for enabling simultaneous adjustment of both said real image distance and said direction of focused and directed solar energy wherein adjustment of said real image distance by said adjusting means results in a selection of either cutting, shaping, or polishing of said material.

9. The apparatus of claim 8 wherein said material is a metal or metal alloy.

10. The apparatus of claim 8 wherein said material is rock.

11. The apparatus of claim 8 wherein said real image distance and said direction are simultaneously adjustable by a single person.

12. The apparatus of claim 8 wherein said real image distance and said direction are independently and simultaneously adjustable.

13. The apparatus of claim 12 wherein said real image distance and said direction are independently and simultaneously adjustable by a single person, while said single person is simultaneously performing cutting, shaping, or polishing of said material.

14. The apparatus of claim 8 wherein said focusing and directing means comprises first focusing means, second directing means, and means for rotating said second directing means about two different axes, said rotation occurring without corresponding movement of said first focusing means.

15. A method for cutting, shaping, and polishing comprising the steps of focusing and directing a sufficient quantity of solar energy at a variable real image distance and variable direction to enable cutting, shaping, and polishing of a material, adjusting said
variable real image distance to a desired distance while simultaneously either cutting, shaping, or polishing said material by simultaneously adjusting said variable direction to obtain a desired position and movement of a real image.

16. The method of claim 15 wherein the step of adjusting is performed by a single person.

17. The method of claim 16 wherein said material is comprised of rock.

18. The method of claim 16 comprising the additional steps of removing said material which has been cut, and cutting additional material in a predetermined pattern which will result in the formation of a road tunnel.

19. The apparatus of claim 1 wherein said focusing and directing means consists of a first concave parabolic reflector, a second convex parabolic reflector, and a third plane reflector, and wherein said adjusting means consists of a mechanical moving means for moving said second reflector and for moving said third reflector.

* * * * *